US012249445B2

(12) United States Patent
Endo

(10) Patent No.: US 12,249,445 B2
(45) Date of Patent: Mar. 11, 2025

(54) SHUNT RESISTOR

(71) Applicant: KOA CORPORATION, Ina (JP)

(72) Inventor: Tamotsu Endo, Ina (JP)

(73) Assignee: KOA CORPORATION, Ina (JP)

( * ) Notice: Subject to any disclaimer, the term of this patent is extended or adjusted under 35 U.S.C. 154(b) by 280 days.

(21) Appl. No.: 17/919,107

(22) PCT Filed: Apr. 5, 2021

(86) PCT No.: PCT/JP2021/014450
§ 371 (c)(1),
(2) Date: Oct. 14, 2022

(87) PCT Pub. No.: WO2021/215229
PCT Pub. Date: Oct. 28, 2021

(65) Prior Publication Data

US 2023/0162894 A1 May 25, 2023

(30) Foreign Application Priority Data

Apr. 20, 2020 (JP) ................................ 2020-074778

(51) Int. Cl.
*H01C 1/144* (2006.01)
*H01C 13/00* (2006.01)

(52) U.S. Cl.
CPC ............ *H01C 1/144* (2013.01); *H01C 13/00* (2013.01)

(58) Field of Classification Search
CPC ................................ H01C 1/144; H01C 13/00
See application file for complete search history.

(56) References Cited

U.S. PATENT DOCUMENTS

| | | | | |
|---|---|---|---|---|
| 11,562,838 B2 * | 1/2023 | Smith | H01C 17/28 |
| 11,821,922 B2 * | 11/2023 | Thumm | H05K 3/308 |
| 2009/0195348 A1 | 8/2009 | Smith et al. | |
| 2012/0154104 A1 * | 6/2012 | Hetzler | H01C 1/14 29/874 |
| 2013/0181807 A1 | 7/2013 | Hetzler | |

(Continued)

FOREIGN PATENT DOCUMENTS

| | | |
|---|---|---|
| CN | 103180916 A | 6/2013 |
| EP | 2446449 A1 | 5/2012 |

(Continued)

OTHER PUBLICATIONS

WO-2021100084; machine translation (Year: 2021).*

(Continued)

*Primary Examiner* — Kyung S Lee
(74) *Attorney, Agent, or Firm* — WHDA, LLP

(57) ABSTRACT

The present invention relates to a shunt resistor for current detection. The shunt resistor (1) includes: a resistance element (5) having a plate shape; and electrodes (6, 7) connected to both end surfaces (5*a*, 5*b*) of the resistance element (5), wherein the electrodes (6, 7) have cut portions (11, 12), respectively, the cut portions (11, 12) extending parallel to joint portions (8, 9) of the resistance element (5) and the electrodes (6, 7), and each of the cut portions (11, 12) is located at a position where a relationship Y≤0.80X-1.36 holds, where Y is a distance from each joint portion (6, 7) to each cut portion (11, 12), and X is a length of the joint portions (6, 7) in a width direction of the electrodes (6, 7).

5 Claims, 5 Drawing Sheets

(56) References Cited

U.S. PATENT DOCUMENTS

| | | | | |
|---|---|---|---|---|
| 2017/0307658 | A1 | 10/2017 | Chiku et al. | |
| 2018/0120359 | A1* | 5/2018 | Nakamura | H01C 1/14 |

FOREIGN PATENT DOCUMENTS

| | | | | |
|---|---|---|---|---|
| EP | 3712909 | A1 | 9/2020 | |
| JP | H03025994 | A | 2/1991 | |
| JP | 2007078599 | A | 3/2007 | |
| JP | 2007-329421 | A | 12/2007 | |
| JP | 2009266977 | A | 11/2009 | |
| JP | 2011-018759 | A | 1/2011 | |
| JP | 2011-511472 | A | 4/2011 | |
| JP | 2016180765 | A | 10/2016 | |
| JP | 2020-009838 | A | 1/2020 | |
| WO | 2016/063928 | A1 | 4/2016 | |
| WO | 2016132621 | A1 | 8/2016 | |
| WO | 2019181117 | A1 | 9/2019 | |
| WO | WO-2021100084 | A1 * | 5/2021 | G01R 1/203 |

OTHER PUBLICATIONS

Extended (Supplementary) European Search Report dated Jun. 4, 2024, issued in counterpart Application No. 21792601.3. (8 pages).

Office Action dated Jul. 14, 2023, issued in counterpart CN Application No. 202180029182.3. (7 pages).

International Search Report dated Jun. 22, 2021, issued in counterpart International application No. PCT/JP2021/014450.

* cited by examiner

SHUNT RESISTOR

TECHNICAL FIELD

The present invention relates to a shunt resistor for current detection.

BACKGROUND ART

Conventionally, a shunt resistor is widely used in current detecting applications. Such a shunt resistor includes a plate-shaped resistance element and plate-shaped electrodes joined to both ends of the resistance element. The resistance element is made of alloy, such as copper-nickel alloy, copper-manganese alloy, iron-chromium alloy, or nickel-chromium alloy. The electrodes are made of highly conductive metal, such as copper.

The shunt resistor is required to have a small temperature coefficient of resistance (TCR) in order to detect current with little temperature fluctuation. The temperature coefficient of resistance (TCR) is an index that indicates a rate of change in resistance due to temperature change. In order to improve the TCR of the shunt resistor, an alloy with a low TCR, such as Manganin (registered trademark), has been used as a material of the resistance element.

CITATION LIST

Patent Literature

Patent document 1: Japanese laid-open patent publication No. 2007-329421

SUMMARY OF INVENTION

Technical Problem

However, there is a limit to adjusting (improving) the TCR by selecting the material of the resistance element. It is therefore an object of the present invention to provide a shunt resistor allowing for easy adjustment of TCR regardless of a material of a resistance element, i.e., capable of achieving a desired TCR.

Solution to Problem

In an embodiment, there is provided a shunt resistor comprising: a resistance element having a plate shape; and electrodes connected to both end surfaces of the resistance element, wherein the electrodes have cut portions, respectively, the cut portions extending parallel to joint portions of the resistance element and the electrodes, and each of the cut portions is located at a position where a relationship $Y \leq 0.80X-1.36$ holds, where Y is a distance from each joint portion to each cut portion, and X is a length of the joint portions in a width direction of the electrodes.

In an embodiment, the shunt resistor further comprises voltage detection terminals provided on voltage detecting portions located between the joint portions and the cut portions.

In an embodiment, a width of the electrodes at positions where the cut portions are formed is ½ or more of the length of the joint portions in the width direction of the electrodes.

Advantageous Effects of Invention

Each cut portion is formed at a position where the relationship $L \leq 0.80X-1.36$ holds, where Y is the distance from the joint portion to the cut portion, and X is the length of the joint portion in the width direction of the electrodes. The cut portions extend parallel to the joint portions. As a result, a desired TCR can he satisfied with a simple configuration. In addition, the TCR of the shunt resistor can be easily adjusted by the adjustment of the length of the cut portions.

DESCRIPTION OF EMBODIMENTS

Figure 1:
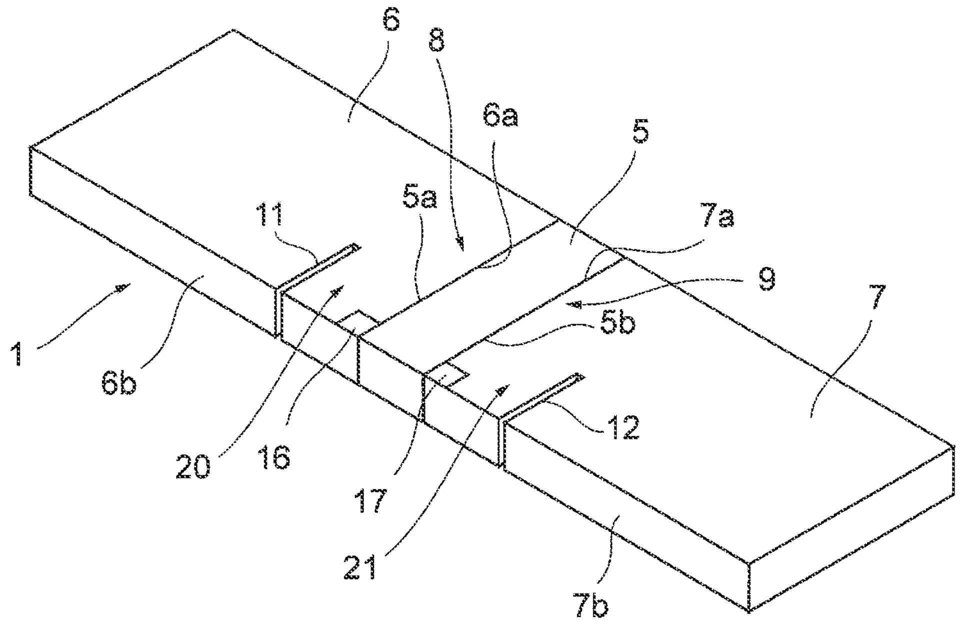
FIG. 1 is a perspective view schematically showing an embodiment of a shunt resistor.
Figure 2:
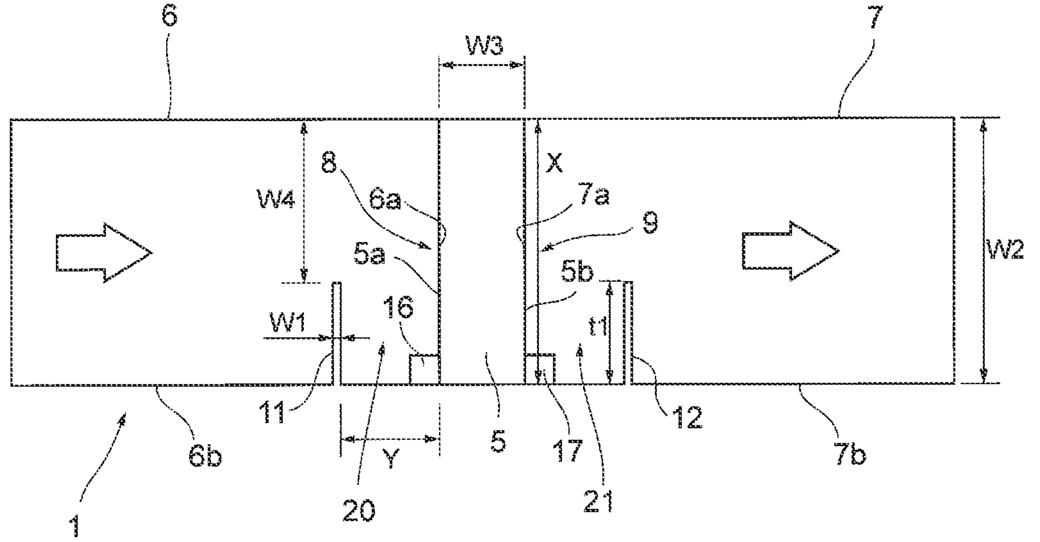
FIG. 2 is a plan view of the shunt resistor shown in FIG. 1.

Hereinafter, embodiments of the present invention will be described with reference to the drawings. FIG. 1 is a perspective view schematically showing an embodiment of a shunt resistor 1, and FIG. 2 is a plan view of the shunt resistor 1 shown in FIG. 1. White arrows shown in FIG. 2 indicate a direction of an electric current flowing through the shunt resistor 1. As shown in FIGS. 1 and 2, the shunt resistor 1 includes a plate-shaped resistance element 5 made of an alloy having a predetermined thickness and a predetermined width, and electrodes 6 and 7 made of a highly conductive metal connected to both end surfaces 5*a* and 5*b* of the resistance element 5. Specifically, the electrode 6 is connected to the end surface 5*a*, and the electrode 7 is connected to the end surface 5*b*. Configurations of the electrode 7, which will not he particularly described, are the same as configurations of the electrode 6. The electrodes 6 and 7 are arranged symmetrically with respect to the resistance element 5. The width of the electrode 6 and the width of the electrode 7 are the same, and are represented by a width W2. A width direction of the electrodes 6 and 7 is a direction perpendicular to the current direction. An example of an alloy forming the resistance element 5 is a nickel-chromium alloy. An example of the highly conductive metal forming the electrodes 6 and 7 is copper.

Specifically, inner end surfaces 6*a* and 7*a* of the electrodes 6 and 7 are joined to the both end surfaces 5*a* and 5*b* of the resistance element 5, respectively, by means of welding (for example, electron beam welding, laser beam welding, or brazing). The inner end surfaces 6*a* and 7*a* are joint surfaces joined to the resistance element 5. Hereinafter, in this specification, the inner end surfaces 6*a* and 7*a* may be referred to as joint surfaces 6*a* and 7*a*.

The inner end surface 6*a* of the electrode 6 and the end surface 5*a* of the resistance element 5 constitute a joint portion 8 of the resistance element 5 and the electrode 6. The inner end surface 7*a* of the electrode 7 and the end surface 5*b* of the resistance element 5 constitute a joint portion 9 of the resistance element 5 and the electrode 7.

The electrodes 6 and 7 have cut portions 11 and 12, respectively. The cut portions 11 and 12 extend parallel to the joint portions 8 and 9 (i.e., the joint surfaces 6*a* and 7*a* and both end surfaces 5*a* and 5*b*), respectively. The cut portions 11 and 12 of this embodiment have a slit shape extending linearly. The cut portion 11 extends linearly from a side surface 6*b* of the electrode 6 toward the center of the electrode 6, and the cut portion 12 extends linearly from a side surface 7*b* of the electrode 7 toward the center of the electrode 7.

Configurations of the cut portion 12, which will not be particularly described, are the same as those of the cut portion 11. The cut portion 11 and the cut portion 12 are arranged symmetrically with respect to the resistance element 5. In this embodiment, the cut portion 12 has the same width W1 as the width of the cut portion 11. A length of the cut portion 11 in a width direction of the electrodes 6 and 7 (i.e., a direction parallel to the joint surfaces 6*a* and 7*a* and perpendicular to the current direction) is the same as a length of the cut portion 12 in the width direction of the electrodes 6 and 7, and both lengths are denoted by t1.

The cut portions 11 and 12 formed in the electrodes 6 and 7 causes the electric current flowing through he shunt resistor 1 to avoid the cut portions 11 and 12. As a result, a state of the electric current flowing through the shunt resistor 1 is different from a state of electric current flowing through a shunt resistor without the cut portions. As a result, a TCR (temperature coefficient of resistance) of the shunt resistor 1 is different from a TCR (temperature coefficient of resistance) of a shunt resistor without cut portions in electrodes.

in this embodiment, a length of the joint portion 8 (or the joint surface 6*a* and the end surface 5*a*) in the width direction of the electrode 6 is the same as a length of the joint portion 9 (or the joint surface 7*a* and the end surface 5*b*) in the width direction of the electrode 7. A distance from the joint portion 8 (or the joint surface 6*a*) to the cut portion 11 is the same as a distance from the joint portion 9 (or the joint surface 7*a*) to the cut portion 12. In the present embodiment, the cut portions 11 and 12 are located such that a relationship expressed by a formula (1) $Y \leq 0.80X-1.36$ holds, where Y represents the distance from each of the joint portions 8 and 9 to each of the cut portions 11 and 12. and X represents the length of the joint portions 8 and 9 in the width direction of the electrodes 6 and 7.

The TCR of the shunt resistor 1 can be adjusted by forming the cut portions 11 and 12 at positions where the relationship of the above formula (1) holds. Specifically, when the cut portions 11 and 12 are formed at positions where the relationship of the above formula (1) is established, the TCR of the shunt resistor 1 can be adjusted by changing the length t1 of the cut portions 11 and 12. In other words, the temperature coefficient of resistance of the shunt resistor 1 can be adjusted by forming the cut portions 11 and 12 having an adjusted length t1 at positions where the relationship of the above formula (1) holds.

Voltage detection terminals 16 and 17 are provided on surfaces of the electrodes 6 and 7, respectively. The voltage detection terminals 16 and 17 are used for measuring a voltage generated across the resistance element 5 (i.e., generated between both end surfaces 5*a* and 5*b*). For example, a aluminum wires are coupled to the voltage detection terminals 16 and 17, so that the voltage generated between both end surfaces of the resistance element 5 is detected. The voltage detection terminal 16 is provided on a voltage detecting portion 20 of the electrode 6, and the voltage detection terminal 17 is provided on a voltage detecting portion 21 of the electrode 7. The voltage detecting portion 20 is located between the joint portion 8 and the cut portion 11, rind the voltage detecting portion 21 is located between the joint portion 9 and the cut portion 12.

The voltage detection terminals 16 and 17 provided on the voltage detecting portions 20 and 21 (i.e., the voltage detecting portions 20 and 21 located in voltage detecting positions) can allow for measuring of the voltage reflecting the adjusted TCR. Specifically, the voltage of the resistance element 5 can be measured while the TCR of the shunt resistor 1 is affected by the cut portions 11 and 12. The arrangements of the voltage detection terminals 16 and 17 adjacent to the resistance element 5 make it possible to measure the voltage that more reflects the adjusted TCR.

Figure 3:
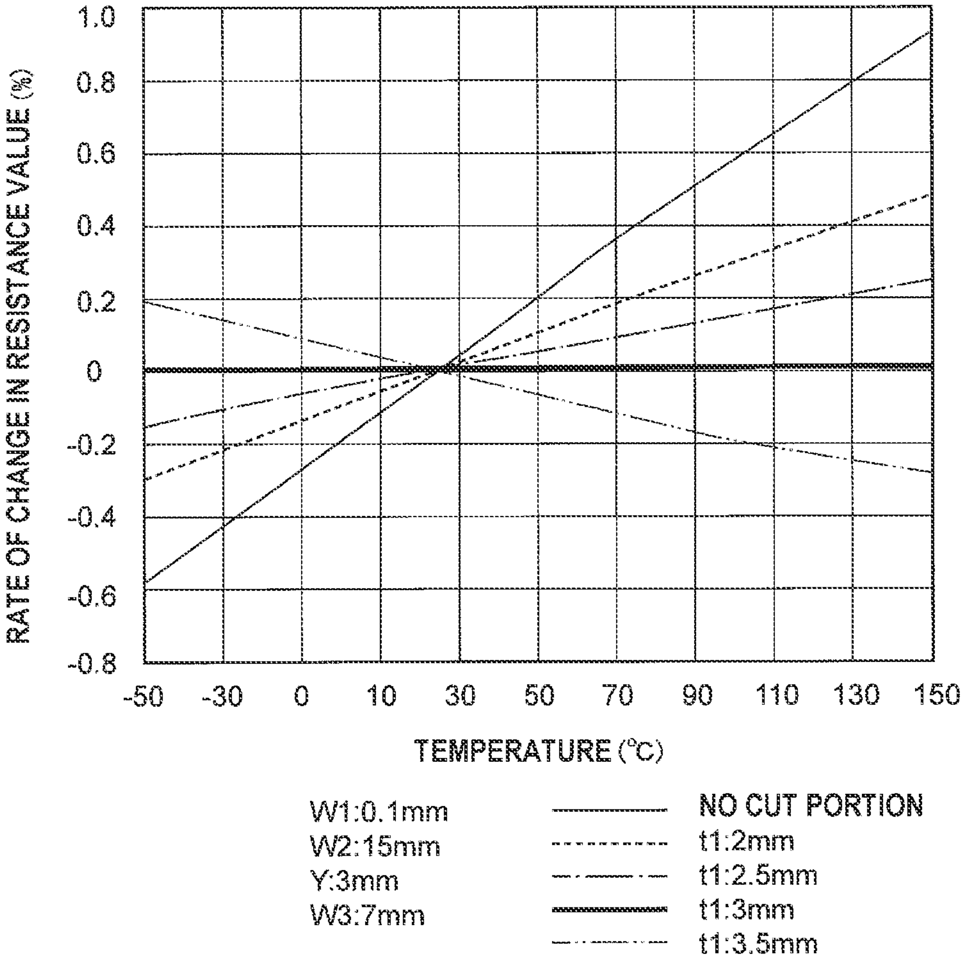
FIG. 3 is a graph showing a rate of change in resistance value of the shunt resistor due to temperature change.

FIG. 3 is a graph showing a rate of change in a resistance value of the shunt resistor 1 due to temperature change. FIG. 3 shows the rate of change in the resistance value of the shunt resistor 1 according to the change in temperature when the resistance element 5 is made of a nickel-chromium alloy and the electrodes 6 and 7 are made of copper. The cut portions 11 and 12 are formed at positions where the relationship of the above formula (1) holds. In FIG. 3, the width W1 (see FIG. 2) of the cut portions 11 and 12 is 0.1 mm, the width W2 (see FIG. 2) of the electrodes 6 and 7 is 15 mm, the width W3 of the resistance element 5 (see FIG. 2) is 7 mm, and the distance (see FIG. 2) from each of the joint portions 8 and 9 (or the joint surfaces 6*a* and 7*a*) to each of the cut portions 11 and 12 is 3 mm.

FIG. 3 shows the rate of change in the resistance value of the shunt resistor with the temperature change when the length t1 of the cut portions 11 and 12 is 2 mm, 2.5 mm, 3 mm, and 3.5 mm. For comparison, FIG. 3 further shows a rate of change in a resistance value of a shunt resistor in which the cut portions 11 and 12 are not formed. Other configurations of the shunt resistor in which the cut portions 11 and 12 are not formed are the same as those of the shunt resistor 1.

FIG. 3 shows that, when the cut portions 11 and 12 having the width W1 of 0.1 mm are formed in the electrodes 6 and 7, a ratio of the rate of change in the resistance value to an amount of change in temperature of the shunt resistor 1 is reduced. The ratio of the rate of change in the resistance value to the amount of change in temperature of the shunt resistor 1 corresponds to the temperature coefficient of resistance (TCR) of the shunt resistor 1. Furthermore, FIG. 3 shows that the temperature coefficient of resistance of the shunt resistor 1 depends on the length t1 of the cut portions 11 and 12. Specifically, FIG. 3 shows that the adjustment of the length t1 of the cut portions 11 and 12 when the cut portions 11 and 12 are formed at the positions where the relationship of the above formula (1) holds, i.e., the cut portions 11 and 12 having the adjusted length t1 formed at the positions where the relationship of the above formula (1) holds, allows for the adjustment of the temperature coefficient of resistance (TCR) of the shunt resistor 1.

As shown in FIG. 3, as the length t1 of the cut portions 11 and 12 increases, the temperature coefficient of resistance of the shunt resistor 1 decreases. When the length t1 is 3 mm, an absolute value of the temperature coefficient of resistance of the shunt resistor 1 is minimized. When the length t1 is 3.5 mm, the temperature coefficient of resistance of the shunt resistor 1 has a negative slope. Therefore, by adjusting the length t1 of the cut portions 11 and 12, i.e., by forming the cut portions 11 and 12 having an adjusted length t1 at the positions where the relationship of the above formula (1) holds, the temperature coefficient of resistance (TCR) of the shunt resistor 1 can be adjusted over a wide range (i.e., a desired TCR can be achieved). As a result, an optimum TCR adjustment can be achieved not only when a nickel-chromium alloy is used for the resistance element 5, but also when various alloys are used for the resistance element 5. According to the present embodiment, the desired temperature coefficient of resistance can be achieved with a simple structure in which the cut portions 11 and 12 having an adjusted length t1 are formed at positions where the above formula (1) holds.

In this embodiment, the width W3 of the resistance element 5 is 7 mm, and the width W1 of the cut portions 11 and 12 is 0.1 mm. It should be noted, however, the widths W3 and W1 are not limited to this embodiment. The TCR of the shunt resistor 1 can be adjusted by the adjustment of the length t1 of the cut portions 11 and 12 regardless of the magnitudes of the width W3 and the width W1. When the cut portions 11 and 12 are formed at positions where the relationship of the above formula (1) holds and the cut portions 11 and 12 extend parallel to the joint portions 8 and 9, the temperature coefficient of resistance (TCR) of the shunt resistor 1 can be adjusted easily (i.e., a desired TCR can be achieved) by adjusting the length t1 of the cut portions 11 and 12, i.e., by forming the cut portions 11 and 12 having an adjusted length t1 at the positions where the relationship of the above formula (1) holds.

As shown in FIG. 2, a width W4 of the electrode 6 (and the electrode 7) narrowed by the formation of the cut portion 11 (and the cut portion 12) is preferably ½ or more of a length X of the joint portions 8 and 9. In other words, the width W4 of the electrodes 6 and 7 is a width of the electrodes 6 and 7 at positions where the cut portions 11 and 12 are formed with respect to a direction perpendicular to the width direction of the electrodes 6 and 7. The width W4 having ½ or more of the length X allows the electrodes 6 and 7 to have sufficient mechanical strength, and can prevent a decrease in high-frequency characteristics of the shunt resistor 1 that can occur due to the decrease in the width W4. The results of FIG. 3 show that, when the cut portions 11 and 12 are formed at positions where the relationship of the above formula (1) holds, the TCR can vary widely while the width W4 is ½ or more of the length X.

Figure 4:
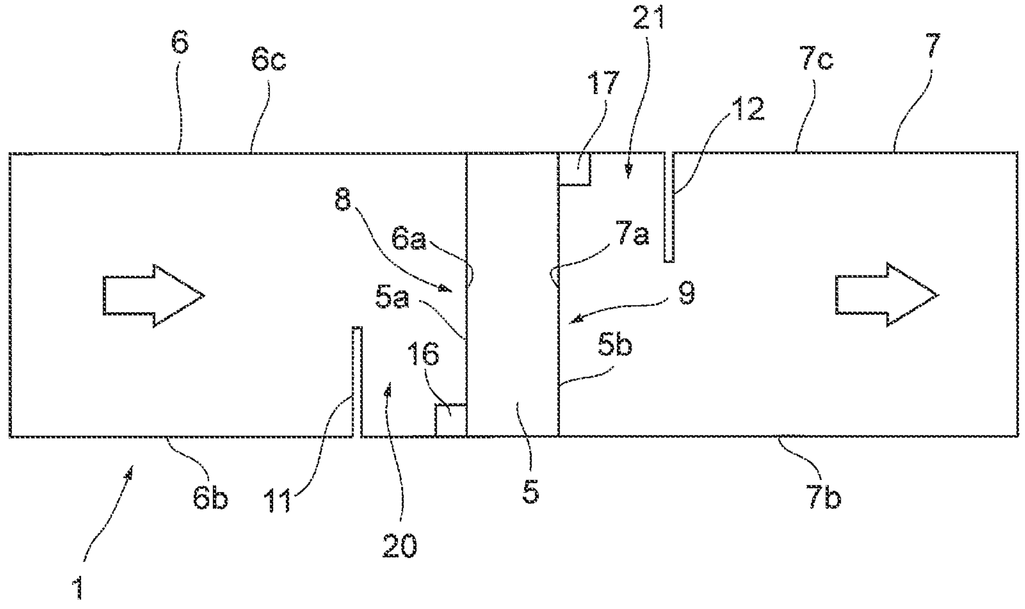
FIG. 4 is a plan view showing another embodiment of a shunt resistor.

FIG. 4 is a plan view showing another embodiment of the shunt resistor 1. Configurations of this embodiment, which will not be particularly described, are the same as those of the embodiments described with reference to FIGS. 1 and 2, and redundant descriptions thereof will be omitted. In this embodiment, the cut portion 12 extends from a side surface 7*c* of the electrode 7 toward the center of the electrode 7. Side surfaces 6*c* and 7*c* shown in FIG. 4 are opposite surfaces from the side surfaces 6*b* and 7*b*.

In this embodiment also, when the cut portions 11 and 12 are formed at positions where the relationship of the above formula (1) holds, the temperature coefficient of resistance (TCR) of the shunt resistor 1 can be adjusted (i.e., a desired TCR can be achieved) by adjusting the length t1 of the cut portions 11 and 12, i.e., by forming the cut portions 11 and 12 having an adjusted length t1 at the positions where the relationship of the above formula (1) holds. In an embodiment, the cut portion 11 may be formed so as to extend from the side surface 6*c* of the electrode 6 toward the center of the electrode 6, and the cut portion 12 may be formed so as to extend from the side surface 7*b* of the electrode 7 to the center of the electrode 7.

Figure 5:
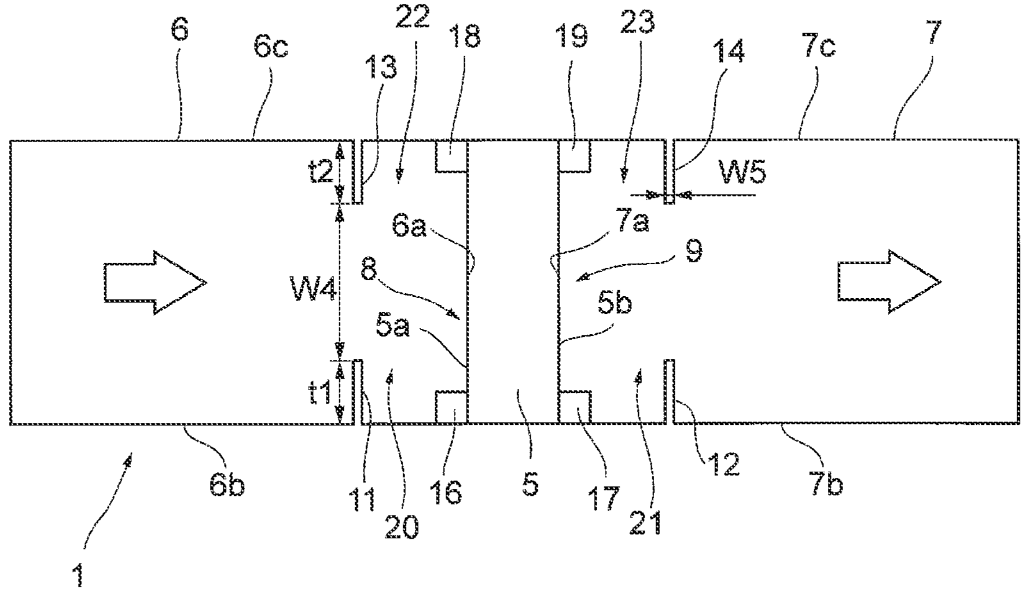
FIG. 5 is a plan view showing still another embodiment of a shunt resistor.

FIG. 5 is a plan view showing still another embodiment of the shunt resistor 1. Configurations of this embodiment, which will not be particularly described, are the same as those of the embodiments described with reference to FIGS. 1 and 2, and redundant descriptions thereof will be omitted. In this embodiment, the electrode 6 further has a cut portion 13, and the electrode 7 further has a cut portion 14.

The cut portions 13 and 14 extend parallel to the joint portions 8 and 9 (or the joint surfaces 6*a* and 7*a* and both end surfaces 5*a* and 5*b*), respectively. The cut portions 13 and 14 of this embodiment have a slit shape extending linearly. The cut portion 13 extends linearly from the side surface 6*c* of the electrode 6 toward the center of the electrode 6, and the cut portion 14 extends linearly from the side surface 7*c* of the electrode 7 toward the center of the electrode 7. The cut portion 13 is formed on an extension line of the cut portion 11, and the cut portion 14 is formed on an extension line of the cut portion 12. Specifically, the cut portions 13 and 14 are arranged at the same positions as the cut portions 11 and 12, respectively, in the direction perpendicular to the width direction of the electrodes 6 and 7.

Configurations of the cut portion 14, which will not he particularly described, are the same as those of the cut portion 13. The cut portion 13 and the cut portion 14 are arranged symmetrically with respect to the resistance element 5. In this embodiment, the cut portion 14 has a width W5 which is the same as a width of the cut portion 13. A length of the cut portion 13 in the width direction of the electrodes 6 and 7 is the same as a length of the cut portion 14 in the width direction of the electrodes 6 and 7, and both of these lengths are represented by length t2.

in this embodiment, voltage detection terminals 18 and 19 are provided on the surfaces of the electrodes 6 and 7, respectively. The voltage detection terminal 18 is provided on a voltage detecting portion 22 of the electrode 6, and the voltage detection terminal 19 is provided on a voltage detecting portion 23 of the electrode 7. The voltage detecting portion 22 is located between the joint portion 8 and the cut portion 13. The voltage detecting portion 23 is located between the joint portion 9 and the cut portion 14. Configurations of the voltage detection terminals 18 and 19 and the voltage detecting portions 22 and 23, which are not specifically described, are the same as those of the voltage detection terminals 16 and 17 and the voltage detecting portions 20 and 21, respectively.

Also in this embodiment, when the cut portions 11, 12, 13, and 14 are formed at positions where the relationship of the above formula (1) holds, the temperature coefficient of resistance (TCR) of the shunt resistor 1 can be adjusted (i.e., a desired TCR can be achieved) by adjusting the length t1 of the cut portions 11 and 12 and the length t2 of the cut portions 13 and 14, i.e., by forming the cut portions 11, 12, 13 and 14 having adjusted lengths t1 and t2 at the positions where the relationship of the above formula (1) holds. The length t1 and the length t2 may be the same or different. The width W1 and the width W5 may he the same or different. Also in the present embodiment, the width W4 of the electrodes 6 and 7 narrowed by the formation of the cut portions 11, 12, 13 and 14 is preferably ½ or more of the length X of the joint portions 8 and 9.

Figure 6:
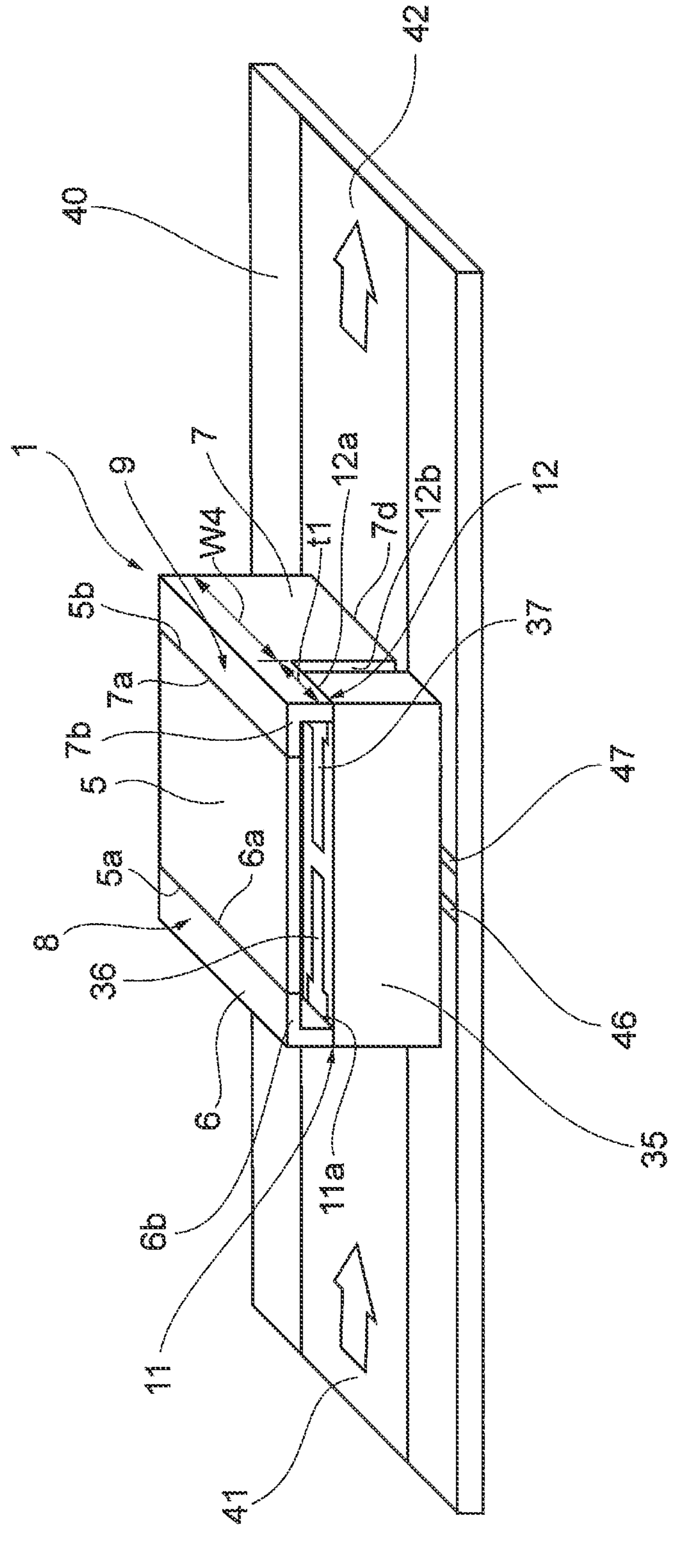
FIG. 6 is a perspective view schematically showing still another embodiment of a shunt resistor.
Figure 7:
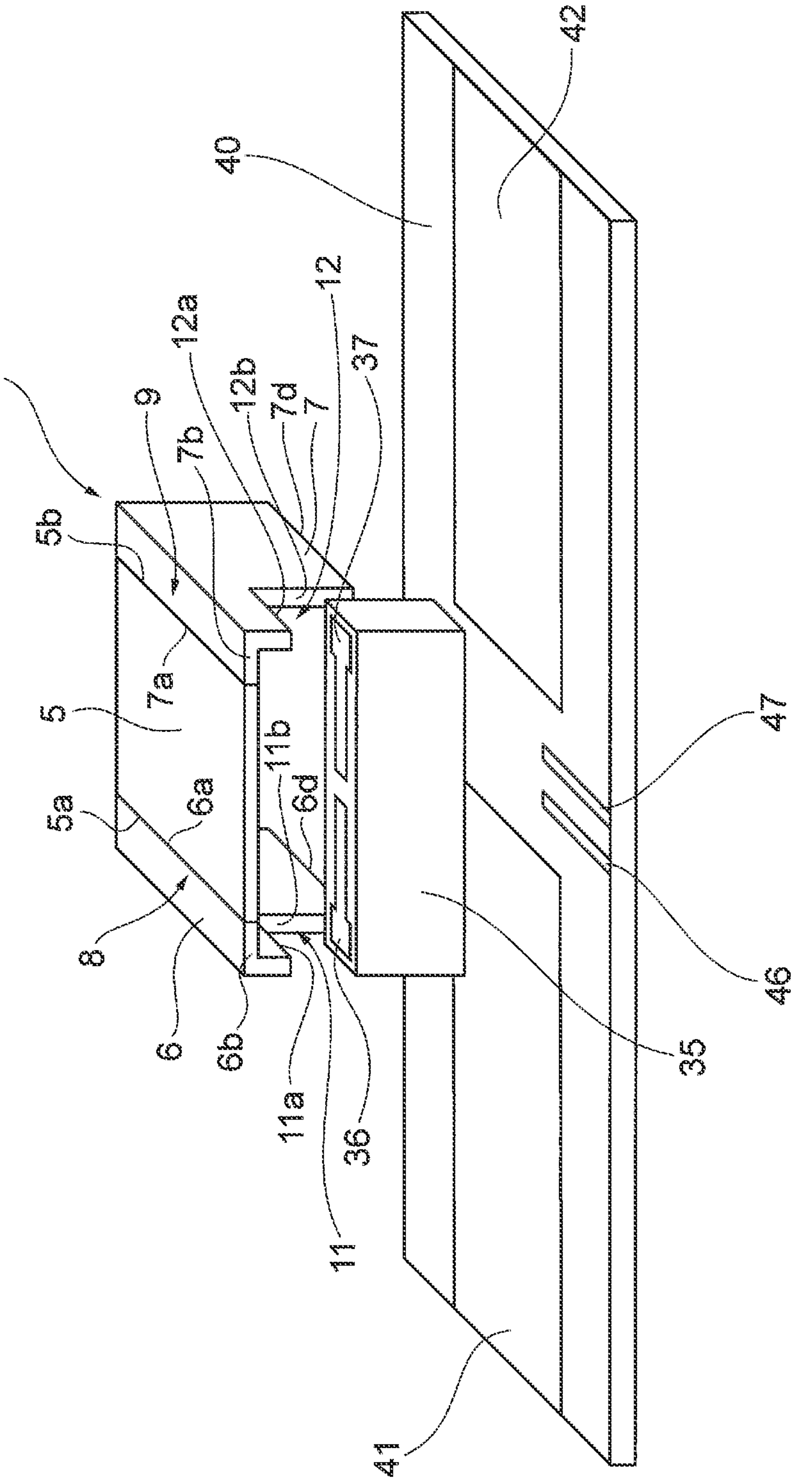
FIG. 7 is an exploded perspective view of the shunt resistor of FIG. 6.

FIG. 6 is a perspective view schematically showing still another embodiment of a shunt resistor 1, and FIG. 7 is an exploded perspective view of the shunt resistor 1 of FIG. 6. Configurations of this embodiment, which will not be particularly described, are the same as those of the embodiments described with reference to FIGS. 1 and 2, and redundant descriptions thereof will be omitted. The shunt resistor 1 of this embodiment further includes a substrate 40 which is made of insulating material, and a pedestal 35. Conductors 41 and 42 and voltage detection terminals 46 and 47 are provided on a surface of substrate 40. White arrows shown in FIG. 6 indicate the direction of electric current flowing through the shunt resistor 1. The pedestal 35 has electrical contacts 36, 37 on its surface.

As shown in FIGS. 6 and 7, the cut portion 11 of this embodiment has a first surface 11*a* extending parallel to the joint portion 8 and a second surface 11*b* extending in a direction perpendicular to the first surface 11*a*. The cut portion 12 has a first surface 12*a* extending parallel to the joint portion 9 and a second surface 12*h* extending in a direction perpendicular to the first surface 12*a*. An outer end surface 6*d* of the electrode 6 and the first surface 11*a* are coupled by the second surface 11*b*, and an outer end surface 7*d* of the electrode 7 and the first surface 12*a* are coupled by the second surface 12*b*.

The electrode 6 is folded at a position between the first surface 11*a* and the joint surface 6*a*, and the electrode 7 is folded at a position between the first surface 12*a* and the joint surface 7*a*. The electrodes 6, 7 are symmetrically bent with respect to the resistance element 5. The outer end faces 6*d* and 7*d* are in contact with the conductors 41 and 42, respectively. With such configurations, the electric current flows from the conductor 41 through the electrode 6, the resistance element 5, and the electrode 7 to the conductor 42.

The first surfaces 11*a*, 12*a* are in contact with the electrical contacts 36, 37, respectively. The pedestal 35 further includes a plurality of conductive wires (not shown). The electrical contact 36 is coupled to the voltage detection terminal 46 via one of the plurality of conductive wires, and the electrical contact 37 is coupled to the voltage detection terminal 47 via another conductive wire. With such configurations, the voltage generated across the resistance element 5 (i.e., generated between the end surfaces 5*a* and 5*b*) can be measured via the voltage detection terminals 46 and 47. For example, the voltage generated across the resistance element 5 is detected via aluminum wires coupled to the voltage detection terminals 46 and 47.

Also in this embodiment, the electric current flows from the conductor 41 to the conductor 42 while avoiding the cut portions 11 and 12. Therefore, as well as the embodiments described with reference to FIGS. 1 and 2, the temperature coefficient of resistance (TCR) of the shunt resistor 1 can be adjusted (i.e., a desired TCR can be achieved) by adjusting the length t1 of the cut portions 11 and 12 in the width direction of the electrodes 6 and 7, i.e., by forming the cut portions 11 and 12 having an adjusted length t1 at the positions where the relationship of the above formula (1) holds. Also in this embodiment, the width W4 of the electrode 6 (and the electrode 7) narrowed by the formation of the cut portion 11 (and the cut portion 12) is preferably ½ or more of the length X of the joint portions 8 and 9.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a shunt resistor for current detection.

REFERENCE SIGNS LIST

1 shunt resistor
6, 7 electrode
6*a*,7*a* inner end surface (joint surface)
6*b*,7*b* side surface
6*c*,7*c* side surface
6*d*,7*d* outer end surface
8, 9 joint portion
11,12,13,14 cut portion
11*a*,12*a* first surface
11*b*,12*b* second surface
16,17,18,19 voltage detection terminal
20,21,22,23 voltage detecting portion
35 pedestal
36,37 electrical contact
40 substrate
41,42 conductor
46,47 voltage detection terminal

The invention claimed is:

1. A shunt resistor comprising:
a resistance element having a plate shape; and
electrodes connected to both end surfaces of the resistance element,
wherein the electrodes have cut portions, respectively, the cut portions extending parallel to joint portions of the resistance element and the electrodes, and
each of the cut portions is located at a position where a relationship $Y \leq 0.80X - 1.36$ holds, where Y is a distance from each joint portion to each cut portion, and X is a length of the joint portions in a width direction of the electrodes.

2. The shunt resistor according to claim 1, further comprising voltage detection terminals provided on voltage detecting portions located between the joint portions and the cut portions.

3. The shunt resistor according to claim 1, wherein a width of the electrodes at positions where the cut portions are formed is ½ or more of the length of the joint portions in the width direction of the electrodes.

4. The shunt resistor according to claim 1, wherein the resistance element and the electrodes are disposed along a longitudinal direction of the shunt register,
each of the electrodes includes a cut portion at a single position along the longitudinal direction, the cut portion extending perpendicular to the longitudinal direction.

5. The shunt resistor according to claim 4, wherein each of the cut portions is a slit.

* * * * *